(12) United States Patent
    Xia et al.

(10) Patent No.: US 11,901,960 B2
(45) Date of Patent: Feb. 13, 2024

(54) SYSTEM AND METHOD TO PREVENT UNAUTHORIZED VOICE DETECTION VIA FIBER LINKS

(71) Applicant: Verizon Patent and Licensing Inc., Basking Ridge, NJ (US)

(72) Inventors: Tiejun Xia, Richardson, TX (US); Glenn Wellbrock, Wylie, TX (US); Kevin N. Smith, Stewartsville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/738,086

(22) Filed: May 6, 2022

(65) Prior Publication Data
    US 2022/0263587 A1    Aug. 18, 2022

Related U.S. Application Data

(63) Continuation of application No. 17/242,585, filed on Apr. 28, 2021, now Pat. No. 11,349,577, which is a
    (Continued)

(51) Int. Cl.
    *H04B 10/85*    (2013.01)
    *H04M 1/68*     (2006.01)
    *H04B 10/40*    (2013.01)
    *H04B 10/43*    (2013.01)
    *H04B 10/50*    (2013.01)
    *H04B 10/60*    (2013.01)

(52) U.S. Cl.
    CPC .............. *H04B 10/85* (2013.01); *H04M 1/68* (2013.01); *H04B 10/40* (2013.01); *H04B 10/43* (2013.01); *H04B 10/50* (2013.01); *H04B 10/60* (2013.01)

(58) Field of Classification Search
    None
    See application file for complete search history.

(56) References Cited

U.S. PATENT DOCUMENTS

| 4,002,896 A | * | 1/1977 | Davies | ............... H04B 10/5051 |
| | | | | 398/168 |
| 4,904,050 A | | 2/1990 | Dunn et al. | |
| | | | (Continued) | |

FOREIGN PATENT DOCUMENTS

WO    WO-2010126401 A2  *  11/2010  ............. H04K 3/825

*Primary Examiner* — Darren E Wolf (57) ABSTRACT

A random acoustic phase scrambler device is installed in-line with a telecommunications fiber link to prevent voice detection via fiber links. The device includes a transducer to produce vibrations; a length of optical fiber positioned to receive the vibration from the transducer; and a random acoustic phase driver configured to control the intensity and frequency of the vibrations. The transducer produces randomized vibrations within an acoustic bandwidth. The device is configured to introduce device-induced phase changes to signals within the telecommunications fiber link. The bandwidth of the device-induced phase changes is greater than the bandwidth of voice-induced phase changes, and the device-induced phase changes are greater in intensity than the voice-induced phase changes. The device-induced phase changes mask voice-induced phase changes through the telecommunications fiber link that are otherwise detectable by voice detection equipment tapped to the telecommunications fiber link.

20 Claims, 8 Drawing Sheets

Related U.S. Application Data continuation of application No. 16/878,668, filed on May 20, 2020, now Pat. No. 11,018,778.

(56) References Cited

U.S. PATENT DOCUMENTS

| | | | |
|---|---|---|---|
| 5,109,443 A | 4/1992 | Hill et al. | |
| 5,140,636 A | 8/1992 | Albares | |
| 5,253,099 A | 10/1993 | Heidemann | |
| 7,785,020 B2 | 8/2010 | Kim et al. | |
| 7,800,743 B1 | 9/2010 | Huffman et al. | |
| 2003/0043754 A1* | 3/2003 | Brody | H04L 43/50 370/252 |
| 2004/0013364 A1 | 1/2004 | Johnson et al. | |
| 2004/0126117 A1 | 7/2004 | Lo et al. | |
| 2005/0111855 A1 | 5/2005 | Bissessur | |
| 2005/0152700 A1 | 7/2005 | Fling et al. | |
| 2006/0120723 A1* | 6/2006 | Diouf | H04L 49/90 398/71 |
| 2009/0010600 A1* | 1/2009 | Kim | G02B 6/4246 385/90 |
| 2010/0221000 A1 | 9/2010 | Yang et al. | |
| 2011/0102773 A1 | 5/2011 | Lee et al. | |
| 2012/0008937 A1 | 1/2012 | Cheng et al. | |
| 2016/0209181 A1* | 7/2016 | Adrain | F41H 5/013 |

\* cited by examiner

SYSTEM AND METHOD TO PREVENT UNAUTHORIZED VOICE DETECTION VIA FIBER LINKS

CROSS-REFERENCE TO RELATED APPLICATIONS

This application is a continuation of U.S. patent application Ser. No. 17/242,585, filed on Apr. 28, 2021, which is a continuation of U.S. patent application Ser. No. 16/878,668, filed on May 20, 2020 (and issued as U.S. Pat. No. 11,018,778 on May 25, 2021), both of which are titled "System and Method to Prevent Unauthorized Voice Detection via Fiber Links," the contents of which are incorporated herein by reference.

BACKGROUND

Fiber optic networks are widely used for transmitting data at high speeds to and from customer locations. Different Wavelength Division Multiplexing (WDM) systems increase data capacity by using multiple channels over a single fiber, where each channel may be associated with a particular wavelength. While the fiber provides communication channels within the fiber, in some cases, the deployed fiber infrastructure can be used as a sensor to detect conditions, such as vibration, temperature, and noise, external to the fiber along the fiber routes.

DETAILED DESCRIPTION OF PREFERRED EMBODIMENTS

The following detailed description refers to the accompanying drawings. The same reference numbers in different drawings may identify the same or similar elements.

It has recently been shown that activity external to a deployed fiber infrastructure, such as vibration, temperature, and voice, can be detected along fiber routes. This detection technology has potential to improve an optical network provider's network efficiency and provide avenues for new services. However, the detection technology also raises privacy concerns, particularly in relation to voice detection. Customers in private conversation, for example, typically have an expectation of privacy, which an optical network provider would want to maintain. Furthermore, those working in secure environments may require assurance that voice detection via fiber is not taking place. Thus, there is a need to prevent unauthorized voice detection in deployed fiber structures.

Systems and methods described herein provide a small-form-factor random acoustic phase scrambler that can be installed on a fiber to prevent voice detection. The random acoustic phase scrambler may generate acoustic phase changes, along a fiber link, that disrupt the voice-generated phase modulation and prevent voice detection through the fiber link. According to an implementation, the random acoustic phase scrambler generates phase changes at a bandwidth larger than the voice bandwidth to distort the voice-generated phase modulation. The random acoustic phase scrambler has no impact to communication signals carrier by the fiber links since the acoustic frequency is very low compared with that of the communication channels.

Figure 1:
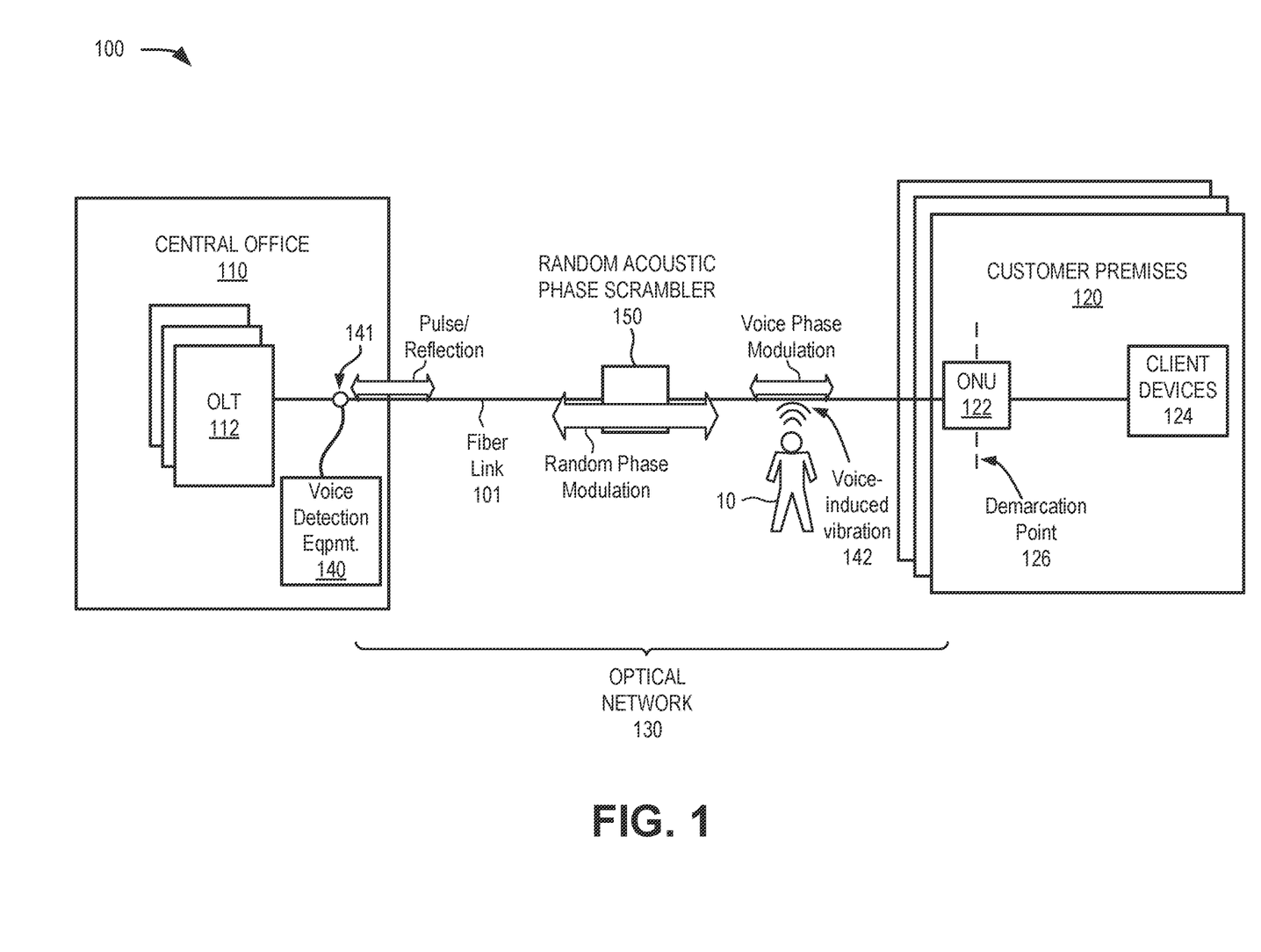
FIG. 1 illustrates an exemplary environment in which systems and methods described herein may be implemented.

FIG. 1 is a diagram illustrating an exemplary environment 100 in which the concepts described herein may be implemented. As shown in FIG. 1, a central office 110 is connected to customer premises 120 using an optical fiber link 101. Fiber link 101 may include a glass fiber configured to carry optical signals. For example, fiber link 101 may include coated glass (e.g., doped silica) fibers for telecommunications. Fiber link 101 may span between optical line terminals (OLTs) 112 or other optical transport equipment in central office 110 and optical network units (ONUs) 122 or another optical interface in customer premises 120. The length of fiber link 101 may be, for example, up to several kilometers. Fiber link 101 may be one of multiple other pathways (not shown), in an optical network 130. that connect central office 110 and customer premises 120.

Central office 110 may include one or more devices, such as computer devices and/or server devices, which ingest content, store content, format content, and/or deliver content to customer premises 120. For example, central office 110 may provide television channels and/or other type of content from a video content delivery system. Central office 110 may include one or more OLTs 110. Furthermore, central office 110 may provide a connection service to optical network 130 for customer premises 120.

OLT 112 may correspond, for example, to an optical blade or card associated with optical signals carried via a passive optical network (PON), such as optical network 130, via fiber link 101. For example, OLT 112 communicates with customer premises 120 via optical network 130 to provide data and/or services to the customer premises 101. Functions of OLT 112 may be governed by one or more controllers (not depicted).

Customer premises 120 may include a multi-dwelling unit or a single dwelling unit. A multi-dwelling unit may include, for example, apartments, offices, condominiums, and/or other types of occupancy units that are aggregated in a high-rise or another type of building. A single dwelling unit may include attached town houses, single detached houses, condominiums, and/or other types of horizontally aggregated occupancy units. Customer premises 120 may include one or more ONUs 122.

ONU 122 may include a device to terminate fiber links 101 at customer premises 120. ONU 122 may demultiplex incoming optical signals into component parts (such as voice telephone, television, and Internet), and provide the signals to user devices (e.g., client devices 124) in customer premises 120. ONU 122 may also transmit outgoing signals from client devices 124 over fiber link 101. ONU 122 may typically indicate a demarcation point 126, the point at which the telecommunication service provider's network ends and a customer's on-premises wiring begins. However, customer fibers downstream of ONU 122 may extend to other customer optical interfaces such as client devices 124. These fibers between ONU 122 and client devices 124 may also be subject to voice detection via fiber. Thus, for purposes of discussion herein, fiber link 101 may be considered to extend between OLT 112 and client devices 124.

Optical network 130 may include components associated with delivery of communications over optical fiber link 101. For example, optical network 130 may include a fiber and various passive optical components such as a splitter, a filter, an attenuator, a modulator, etc. Optical network 130 may also include a component to couple to a device associated with a customer premises, such as an ONU. According to one implementation, optical network 130 may be a passive optical distribution network, in that no amplification, powered optical splitting, or active filtering is used to transmit signals across optical network 130. According to other implementations, optical network 130 may include additional network components associated with an active optical network such as optical amplifiers, switches, Multiplexers, and/or other network devices.

Voice detection equipment 140 may detect conversation that occurs in proximity to fiber link 101. Voice detection via fiber is based on detection of phase modulation of a pulsed Rayleigh backscattering, as the modulation is caused by voice at a particular location of the deployed fiber. Voice detection equipment 140 may be connected at any point along fiber link 101. Voice detection equipment 140 may generate a pulse (e.g., an optical signal) into fiber link 101 at a point of attachment 141. The pulse is transmitted along fiber link 101 and is reflected back to the point of attachment 141. According to an implementation, voice detection equipment 140 may detect changes (e.g., base frequency changes, amplitude changes, etc.) between the originated pulse and the reflection due to vibrations in fiber link 101. Voice detection equipment 140 may include software to interpret the changes and assemble voice patterns of conversations that occur in proximity to fiber link 101 (e.g., separate from traditional voice and data that pass through fiber link 101).

In the illustration of FIG. 1, for example, a voice source 10, such as a person or speaker (e.g., a hardware device), may emit sound (e.g., a voice conversation) at a location, proximate to fiber link 101, anywhere along a length of fiber link 101 between OLT 112 and ONU 122. The voice-induced vibrations may result in voice phase modulation of a pulse that travels in either direction along fiber link 101. Voice detection equipment 140 that connects to fiber link 101 at attachment point 141 may be used to detect the effect of voice-induce vibrations, such as those from voice source 10, at a different point 142 along fiber link 101. While the pulse/reflection carrying the phase modulation travels back to the point of attachment 141 of voice detection equipment 140, any additional vibrations along fiber link 101 (e.g., from other sound, conversations, etc.) will cause additional phase changes to the pulse beyond those attributable to voice-induce vibrations at point 142. These phase changes are normally considered as "noise," which voice detection equipment 140 can effectively filter for voice detection.

Voice detection equipment 140 may be installed, for example, by a telecommunications service provider (also referred to as a "carrier") or another authorized entity to provide services, such as monitoring and/or emergency alert services. In other implementations, voice detection equipment 140 may be attached somewhere along fiber link 101 by unauthorized entity. In either instance, the capabilities of voice detection equipment 140 may raise privacy concerns for some customers. For example, customers with secure facilities (e.g., government entities, technology companies, sensitive businesses, etc.) may require that premises are not accessible to voice detection via fiber.

According to implementations described herein, a random acoustic phase scrambler 150 may be installed on fiber link 101 between voice source 10 and voice detection equipment 140. Random acoustic phase scrambler 150 may be used to intentionally apply different external vibration frequencies (e.g., a controlled noise) to fiber link 101. As described further herein, random acoustic phase scrambler 150 has a bandwidth (e.g., range of frequencies) larger than a human voice bandwidth, for example. By using random acoustic phase scrambler 150 to purposely add randomly generated acoustic phase changes on fiber link 101, and with the generated phase changes having a larger bandwidth than the voice bandwidth, the added random phases will mask the voice-generated phase modulation and make the voice (e.g., at point 142) undetectable to voice detection equipment 140.

As described further herein, random acoustic phase scrambler 150 may be deployed at one or more locations along fiber link 101, such as at central office 110, at different points within customer premises 120, or between central office 110 and customer premises 120. According to an implementation, random acoustic phase scrambler 150 may generally be left in continuous operation or activated whenever network devices for fiber link 101 (e.g., OLT 112 or ONU 122) are operational.

Although FIG. 1 illustrates exemplary components of environment 100, in other implementations, environment 100 may include fewer components, different components, differently arranged components, and/or additional components than those depicted in environment 100. Furthermore, in FIG. 1, the depicted particular arrangement and number of components of environment 100 are illustrated for simplicity. In practice, there may be more fiber links 101, OLTs 112, ONUs 122, optical networks 130, voice detection equipment 140, and random acoustic phase scrambler 150 than depicted in FIG. 1.

Figure 2:
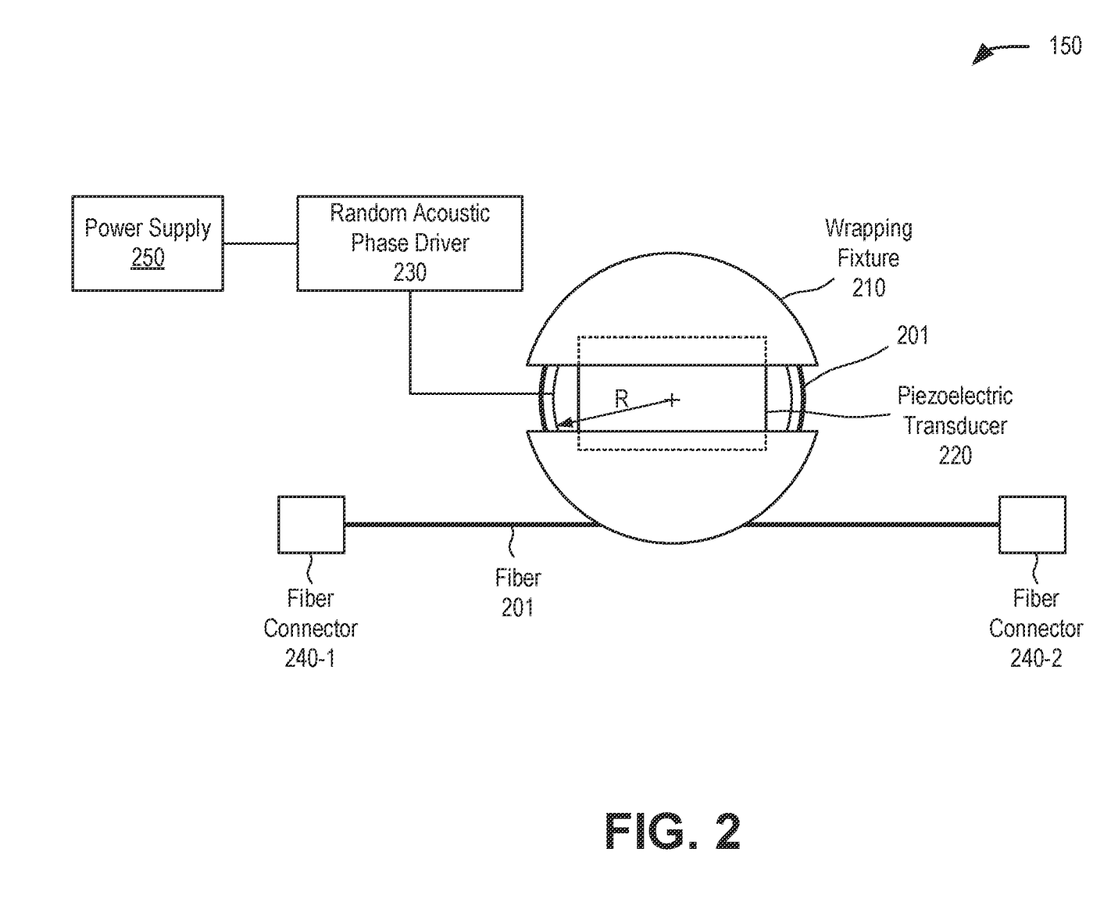
FIG. 2 is an exemplary schematic of the random acoustic phase scrambler of FIG. 1, according to an implementation.

FIG. 2 is an exemplary schematic of the random acoustic phase scrambler 150. In the implementation of FIG. 2, random acoustic phase scrambler 150 may include a short length of fiber 201, a wrapping fixture or housing 210, a piezoelectric transducer 220, a random acoustic phase driver 230, and fiber connectors 240-1 and 240-2 (referred to herein generically as "fiber connector 240" and collectively as "fiber connectors 240").

Fiber 201 may include, for example, the same type of optical fiber used for fiber link 101. Wrapping fixture 210 may hold piezoelectric transducer 220 and provide a guide (or spool) so that fiber 201 may directly or indirectly contact at least a portion of piezoelectric transducer 220. Wrapping fixture 210 may be a relatively rigid molded plastic component. For example, wrapping fixture 210 may be molded from a thermoplastic polymer, such as polyphenylene sulfide (PPS), or a thermoset polymer.

According to an implementation, fiber 201 may be wrapped around piezoelectric transducer 220, and wrapping fixture 210 may provide a wrapping path for fiber 201 with a radius, R, that is equal to or greater than a minimum bend radius of fiber 201. According to another implementation, fiber 201 may be secured to wrapping fixture 210 so that fiber 201 maintains a straight line path while directly or indirectly contacting one side/surface of piezoelectric transducer 220.

Piezoelectric transducer 220 may convert electrical signals (e.g., from random acoustic phase driver 230) into physical vibrations that provide acoustic energy. For example, piezoelectric transducer 220 (e.g., a quartz crystal) may expand and compress in response to electrical signals, causing piezoelectric transducer 220 to stretch and contract fiber 201 (e.g., in a manner that mimics an acoustic affect to fiber 201).

Random acoustic phase driver 230 may include control logic and a power source that applies electrical energy to piezoelectric transducer 220 to produce vibrations that mask acoustic signals. The control logic may be implemented, for example, as hardware, such as an application-specific integrated circuit (ASIC) or a field-programmable gate array (FPGA), firmware, or a combination of hardware and software (e.g., a processor executing software). Random acoustic phase driver 230 may cause piezoelectric transducer 220 to generate vibrations at random sequences and with a significantly greater intensity (e.g., more than double, or up to an order of magnitude greater) than would be generated by voice-induced vibrations. Because the transducer-induced acoustic frequencies are very low compared with frequencies used in the communication channels of the fiber links, the transducer-induced acoustic frequencies will not disrupt communication signals traversing the fiber links 101. According to an implementation, random acoustic phase driver 230 may be connected to a power supply 250 (e.g., a continuous alternating current (AC) power source).

Fiber connector 240 may be used to insert random acoustic phase scrambler 150 in line at an end or between sections of fiber link 101. Each end of fiber 201 may be terminated with a fiber connector 240. To connect fiber 201 to fiber link 101, fiber connector 240 may be connected to another fiber connector (not shown) on fiber link 101. In one implementation, fiber link 101 can be coupled using an adaptor (not shown). In some implementations, the adaptor may join multiple fiber connectors. When fiber connectors are mated, the optical fibers in each cable are aligned with one another to facilitate optical transmission between the optical fibers (e.g., fiber link 101 and fiber 201).

While FIG. 2 provides one embodiment of random acoustic phase scrambler 150, in other embodiments, random acoustic phase scrambler 150 may apply different technologies to generate vibrations that mask the effect of voice-induced vibrations proximate to fiber link 101. For example, random acoustic phase scrambler 150 may use a capacitive transducer or another mechanism to create vibrations on fiber 201.

Figure 3:
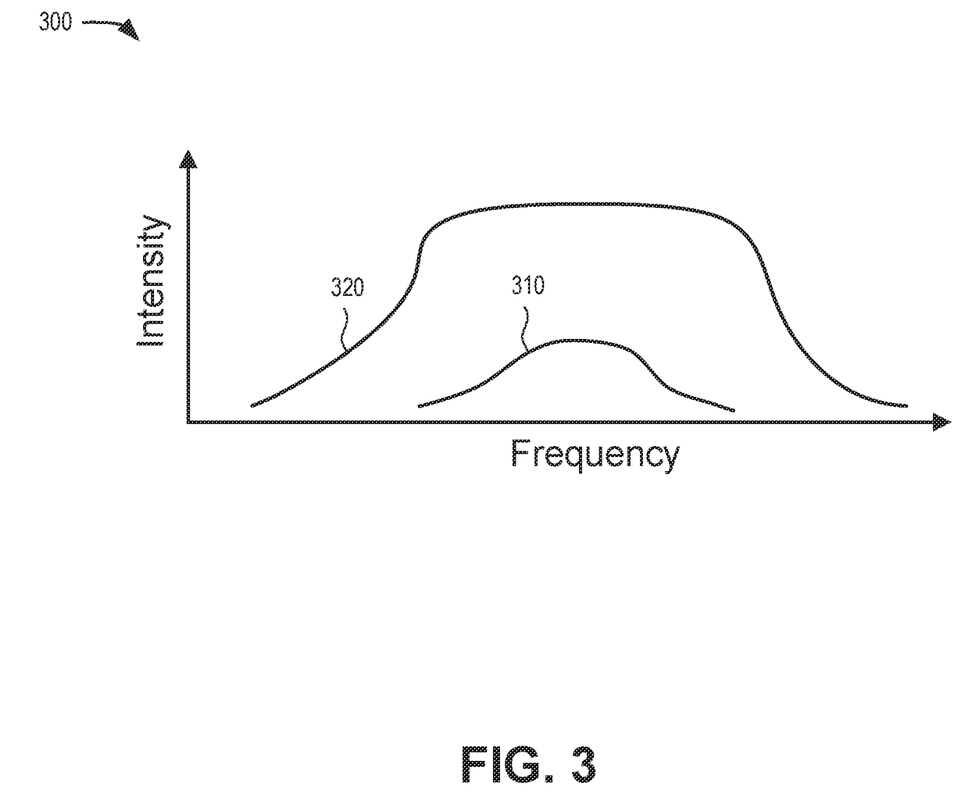
FIG. 3 is an illustration comparing phase changes in a fiber due to voice and due to the random acoustic phase scrambler of FIG. 1.

FIG. 3 is an illustration of a graph 300 comparing potential phase changes in fiber link 101. Line 310 illustrates a phase change representative of the effect of voice-induced vibrations on an optical pulse (e.g., a pulse generated by voice detection equipment 140) in fiber link 101. Line 320 illustrates a phase change representative of the effect of vibrations from random acoustic phase scrambler 150, according to implementations described herein. As shown in FIG. 3, the randomly generated acoustic phase change of line 320 is both wider (e.g., spanning a larger frequency range) and stronger (e.g., with higher intensity) than the voice induced phase change of line 310. Thus, the phase changes induced by random acoustic phase scrambler 150 on fiber link 101 would prevent detection of voice-induced phase changes.

Figure 4A:
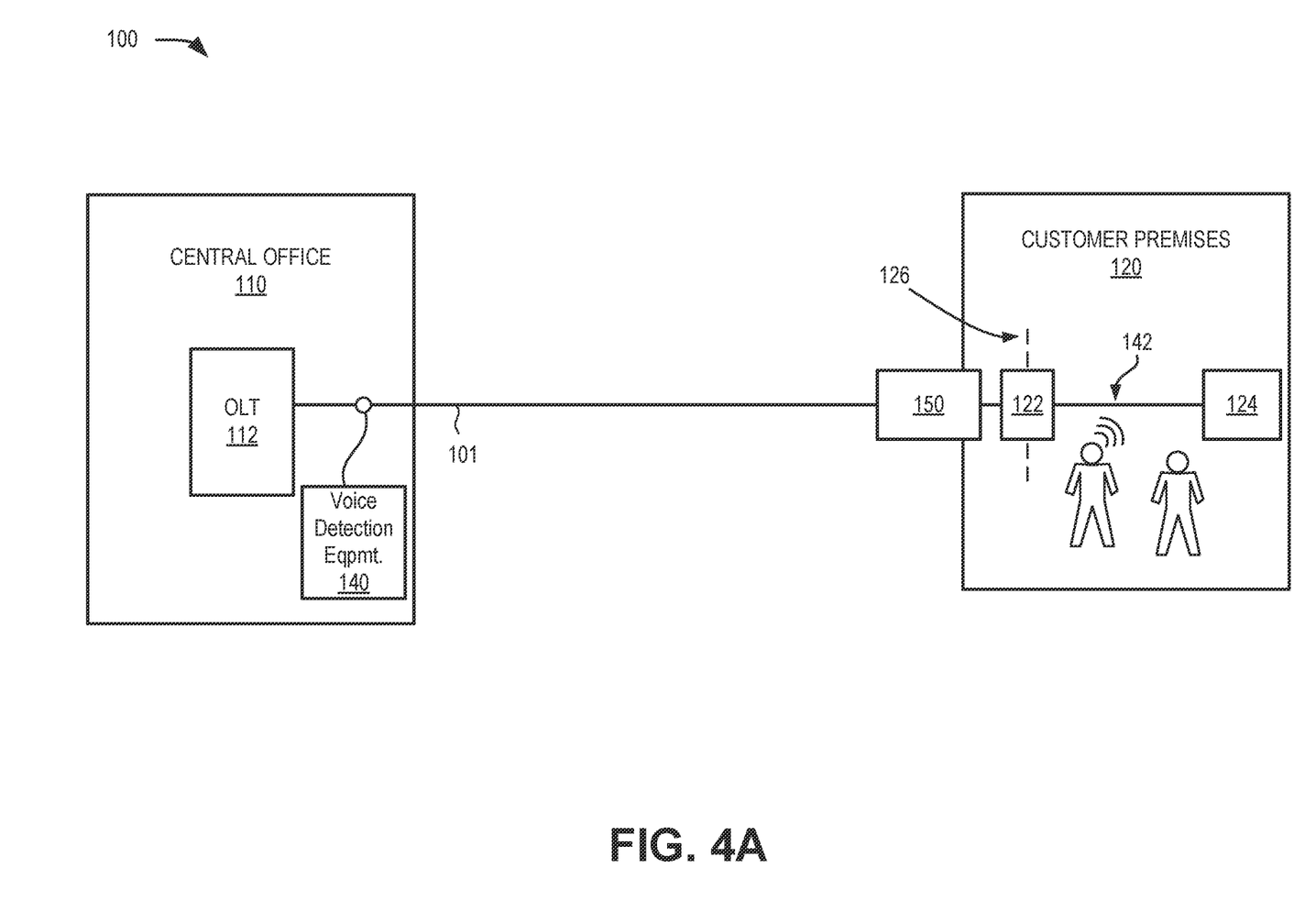
FIG. 4A illustrates an installation location of a random acoustic phase scrambler to protect a client site, in the optical network of FIG. 1.

FIG. 4A is an illustration of a random acoustic phase scrambler 150 installed to protect a customer's privacy in environment 100, according to an embodiment. In the arrangement of FIG. 4A, voice detection equipment 140 could be connected to fiber link 101 at central office 110 to detect voice or other sounds along fiber link 101. To protect a customer's privacy at customer premises 120, random acoustic phase scrambler 150 may be installed at a boundary of customer premises 120. In one implementation, as shown in FIG. 4A, random acoustic phase scrambler 150 may be installed in line with fiber link 101 at customer premises 120 in front of ONU 122, which may include a wavelength division multiplexing (WDM) tapper, for example.

As described above, installation and operation of random acoustic phase scrambler 150 mask the voice-generated phase modulation that could otherwise be detected by voice detection equipment 140 on the portions of fiber link 101 within customer premises 120 (such as point 142 of FIG. 4A). Accordingly, a telecommunications service provider operating optical network 130 could confirm that customer premises are not accessible to voice detection via fiber. For example, the telecommunications service provider could certify that customer premises 120 are protected from voice detection via fiber beyond the demarcation point 126.

Figure 4B:
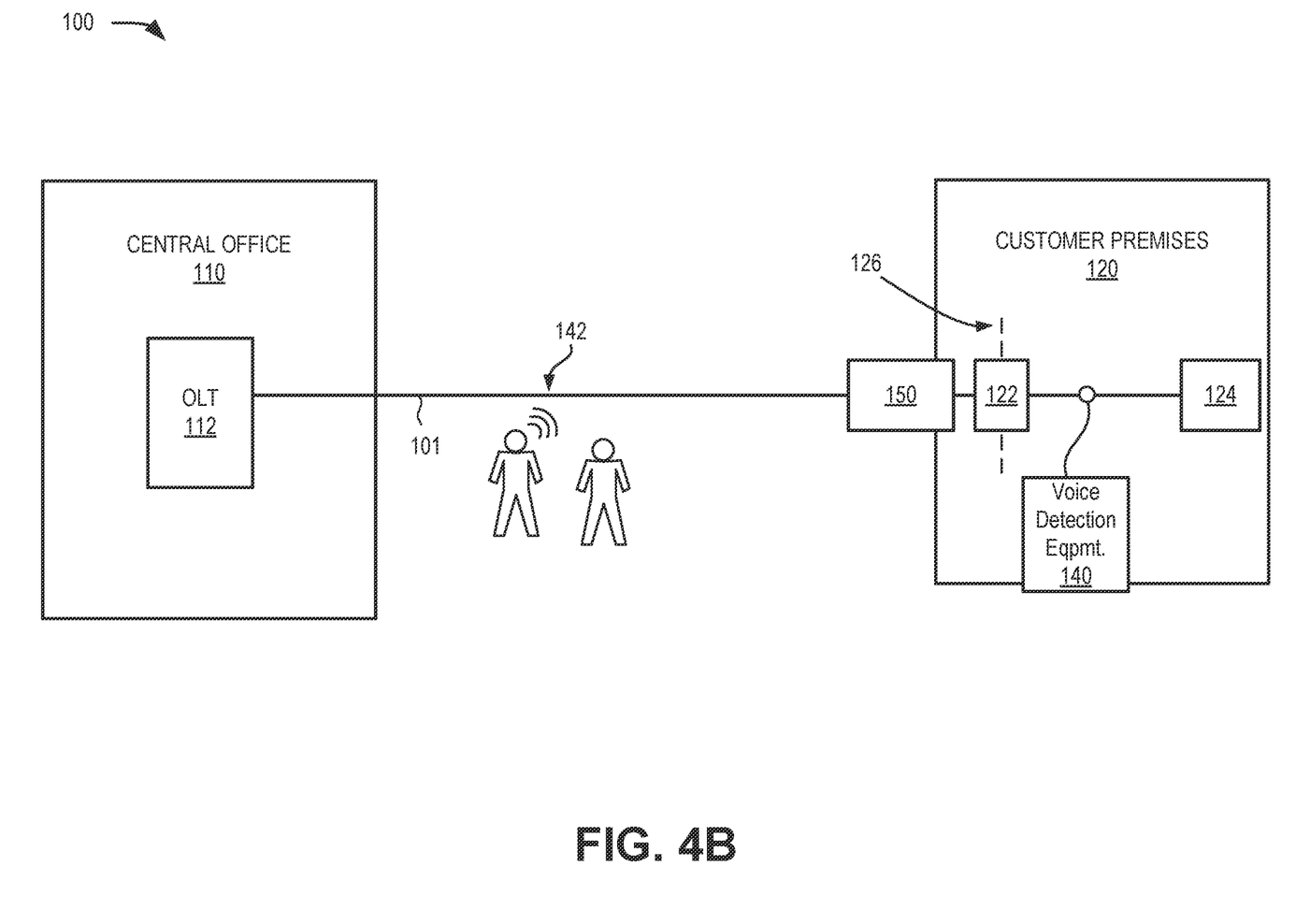
FIG. 4B illustrates an installation location of a random acoustic phase scrambler to prevent voice detection from a client site, in the optical network of FIG. 1.

FIG. 4B is an illustration of a random acoustic phase scrambler 150 installed to prevent unauthorized voice detection from customer premises 120 in environment 100, according to another embodiment. In the arrangement of FIG. 4B, voice detection equipment 140 could be connected to fiber link 101 at customer premises 120 to detect voice or other sounds along fiber link 101. To protect privacy beyond customer premises 120 (e.g., between ONU 122 and OLT 112), random acoustic phase scrambler 150 may be installed at a boundary of customer premises 120. In one implementation, similar to the configuration described above in connection with FIG. 4A, random acoustic phase scrambler 150 may be installed in line with fiber link 101 at customer premises 120 upstream of ONU 122. In another implementation, random acoustic phase scrambler 150 may be installed directly downstream of ONU 122.

Installation and operation of random acoustic phase scrambler 150 mask the voice-generated phase modulation that could otherwise be detected by voice detection equipment 140 on the portions of fiber link 101 between ONU 122 and OLT 112 (such as point 142 of FIG. 4B). Thus, the configuration of FIG. 4B may effectively ensure that a customer or unauthorized party is not able to detect voices, using voice detection equipment 140, beyond demarcation point 126 of customer premises 120.

Figure 4C:
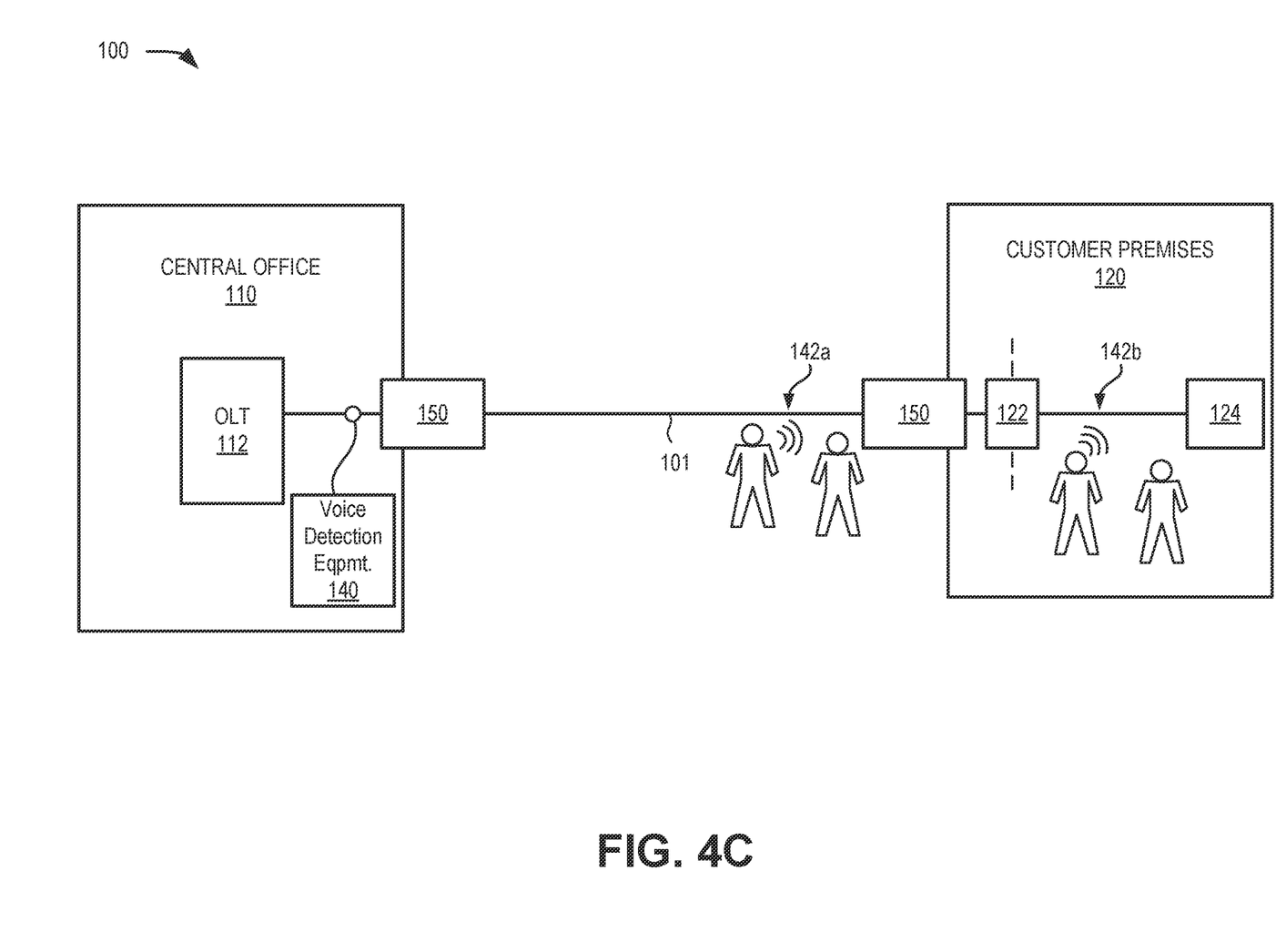
FIG. 4C illustrates an installation location of a random acoustic phase scrambler to prevent voice detection from a central office, in the optical network of FIG. 1.

FIG. 4C is an illustration of a random acoustic phase scrambler 150 installed to prevent unauthorized voice detection from central office 110 in environment 100, according to still another embodiment. In the arrangement of FIG. 4C, voice detection equipment 140 could be connected to fiber link 101 at central office 110 to detect voice or other sounds along fiber link 101. To prevent any use of fiber link 101 for voice detection via fiber (e.g., for any portion of fiber link 101 beyond central office 110), random acoustic phase scrambler 150 may be installed in line with fiber link 101 at or before a boundary of central office 110.

Installation and operation of random acoustic phase scrambler 150 mask the voice-generated phase modulation that could otherwise be detected by voice detection equipment 140 on the portions of fiber link 101 downstream of random acoustic phase scrambler 150 (such as points 142a and 142b of FIG. 4C). Thus, for the configuration of FIG. 4C, a telecommunications service provider (or any authorized or unauthorized employee) would not be able to detect voices, using voice detection equipment 140, beyond the boundary of central office 110 (or the installed location of random acoustic phase scrambler 150).

Figure 4D:
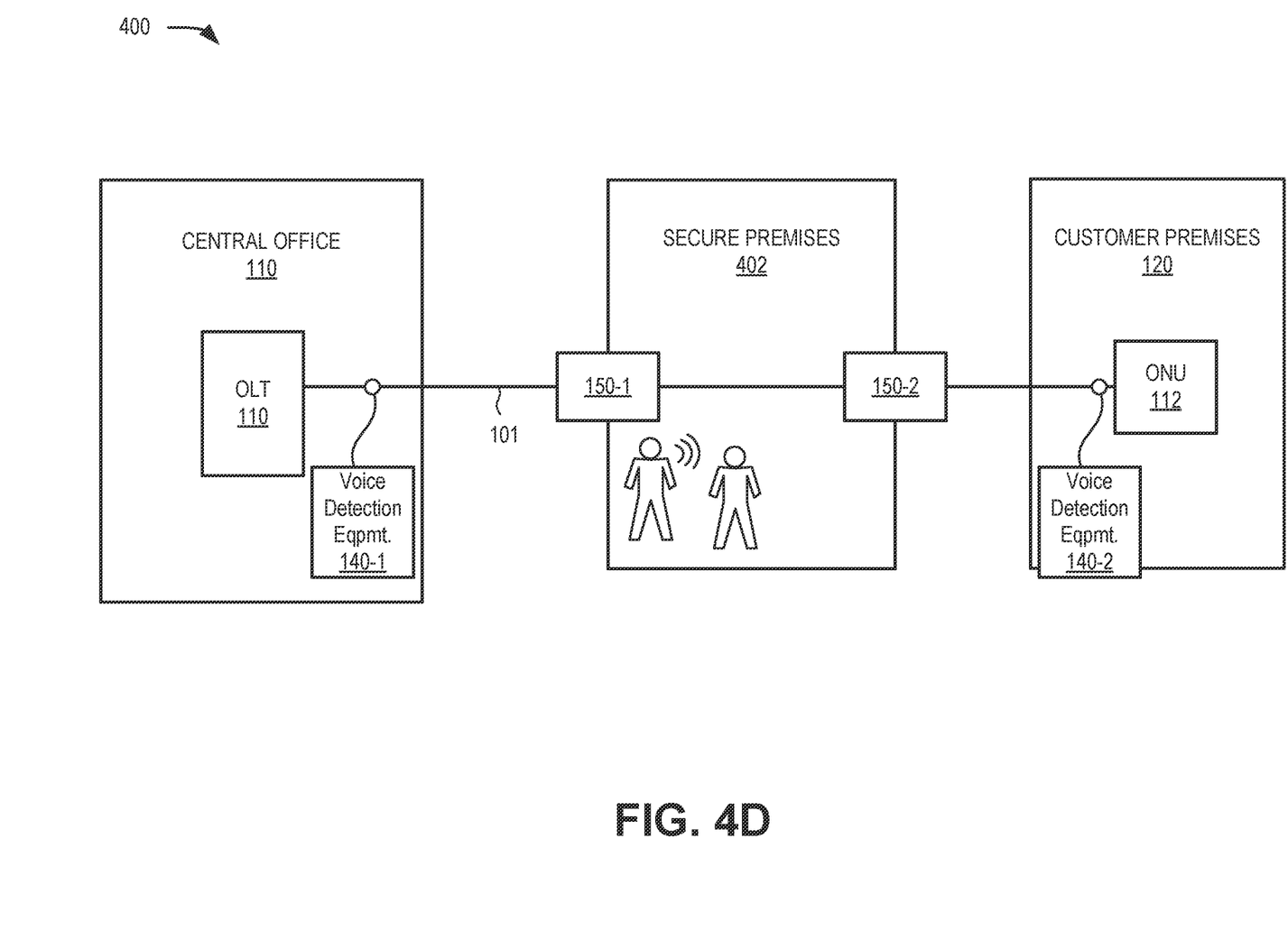
FIG. 4D illustrates an installation location of random acoustic phase scramblers to protect a pass-through site in an optical network.

FIG. 4D is an illustration of multiple random acoustic phase scramblers 150-1 and 150-2 installed to prevent unauthorized voice detection in a secure premises 402 of an environment 400, according to an embodiment. Secure premises 402 may include, for example, a facility where fiber link 101 passes through. For example, secure premises 402 may include an easement through a space or property.

In the arrangement of FIG. 4D, voice detection equipment 140 could be connected to fiber link 101 at either or both of central office 110 and customer premises 120 to detect voice or other sounds along fiber link 101. To prevent any use of fiber link 101 for voice detection via fiber within the boundary of secure premises 402, a random acoustic phase scrambler 150 may be installed in line with fiber link 101 at each boundary crossing of secure premises 402. Thus, random acoustic phase scrambler 150-1 may be installed at a boundary of secure premises 402 closest to central office 110 and random acoustic phase scrambler 150-2 may be installed at a boundary of secure premises 402 closest to customer premises 120.

Figure 5:
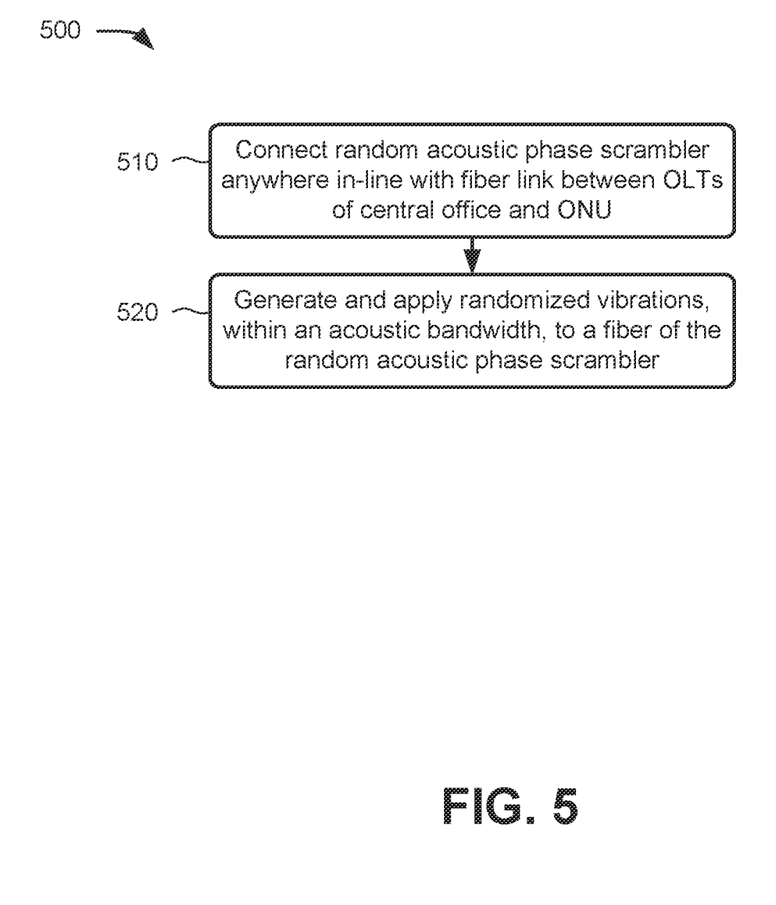
FIG. 5 is a flow diagram of an exemplary process for preventing unauthorized voice detection via fiber links in an optical network, according to an implementation described herein.

FIG. 5 is a flow chart of a process 500 for preventing unauthorized voice detection via fiber links, according to an implementation described herein. Process 500 may include connecting a random acoustic phase scrambler device in-line with a telecommunications fiber link (block 510). For example, random acoustic phase scrambler 150 may be installed upstream of demarcation point 126 to customer premises 120 to prevent detection of voices at customer premises 120 by a carrier. Alternatively, random acoustic phase scrambler 150 may be installed downstream of demarcation point 126 to prevent detection of voices outside customer premises 120 by a customer. In another implementation, random acoustic phase scrambler 150 may be installed within the central office to prevent detection of voices outside the central office by carrier personnel.

Process 500 may further include generating and applying randomized vibrations, within an acoustic bandwidth, to a fiber of the random acoustic phase scrambler (block 520). For example, random acoustic phase scrambler 150 may be activated/powered to generate randomized vibrations through piezoelectric transducer 220. The vibrations may introduce phase changes to signals within fiber link 101. The bandwidth of the transducer-induced phase changes is wider than that of voice-initiated phase changes, and the transducer-induced phase changes have a greater intensity than that of the voice-initiated phase changes. Therefore, the phase changes can mask voice-induced phase changes through the fiber link 101 that are otherwise detectable by voice detection equipment 140.

Systems and method described herein use randomly scrambled phase change to destroy voice-induced phase changes so that conversations that occur near fiber links cannot be detected through fiber links via voice detection equipment. According to an implementation, a random acoustic phase scrambler device is installed in-line with a telecommunications fiber link to prevent voice detection via fiber links. The device includes a transducer to produce vibrations; a length of optical fiber positioned to receive the vibration from the transducer; and a random acoustic phase driver configured to control the intensity and frequency of the vibrations. The transducer produces randomized vibrations with frequencies in an acoustic bandwidth. The device is configured to introduce device-induced phase changes to signals within the telecommunications fiber link. The bandwidth of device-induced frequencies is wider than a voice-initiated bandwidth and has a greater intensity than the voice-initiated bandwidth. The device-induced phase changes mask voice-induced phase changes through the telecommunications fiber link that are otherwise detectable by voice detection equipment tapped to the telecommunications fiber link.

Systems and methods described herein may (1) protect client's privacy for voice conversations in customer premises, (2) prevent use of a carrier's fiber link to perform unauthorized voice detection from customer premises, and (3) prevent a carrier's personnel from using voice detection equipment to detect voice of a client's private fiber link. In still another implementation, two or more random acoustic phase scramblers may be used to prevent voice detection over a portion of a fiber link that passes through secure premises. The random acoustic phase scrambler has no impact to communication signals traversing the fiber links since any signal generated due to the random acoustic phase scrambler's transducer has frequencies in the acoustic range, which is very low compared with frequencies of the communication channels in the fiber links.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor of a device.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method, comprising:
    installing an acoustic phase scrambler device on a fiber link at a first boundary of a facility, wherein the acoustic phase scrambler device includes:
        a transducer configured to apply vibrations to the fiber link, and
        an acoustic phase driver configured to control the transducer; and
    generating, using the acoustic phase scrambler device, vibrations within an acoustic bandwidth, wherein the vibrations introduce random phase changes to signals in the fiber link, and
    installing another acoustic phase scrambler device in-line with the fiber link at a second boundary of the facility.

2. The method of claim 1, wherein a first bandwidth of the random phase changes is greater than a second bandwidth of voice-induced phase changes.

3. The method of claim 1, wherein the random phase changes have greater intensity than voice-induced phase changes.

4. The method of claim 1, wherein installing the acoustic phase scrambler device at the first boundary of the facility further comprises:
    installing the acoustic phase scrambler device within the facility.

5. The method of claim 1, wherein installing the acoustic phase scrambler device at the first boundary of the facility further comprises:
    installing the acoustic phase scrambler device within a central office to prevent detection of voices, outside the central office, through the fiber link.

6. The method of claim 1, wherein generating the vibrations further comprises:
    generating random phase changes having more than double the intensity than would be generated by voice-induced vibrations and without disrupting communication signals traversing the fiber link.

7. A system comprising:
    a fiber link crossing a first and second boundary of a facility;
    a first acoustic phase scrambler device installed on the fiber link at the first boundary of the facility,
        wherein the first acoustic phase scrambler device includes a transducer configured to apply vibrations to the fiber link, and an acoustic phase driver configured to control the transducer; and
        wherein the first acoustic phase scrambler device generates vibrations, within an acoustic bandwidth, that introduce random phase changes to signals in the fiber link; and
    a second acoustic phase scrambler device installed in-line with the fiber link at the second boundary of the facility.

8. The system of claim 7, wherein a first bandwidth of the random phase changes is greater than a second bandwidth of voice-induced phase changes.

9. The system of claim 7, wherein the random phase changes have greater intensity than voice-induced phase changes.

10. The system of claim 7, wherein the first acoustic phase scrambler device is installed within the facility.

11. The system of claim 7, wherein the first acoustic phase scrambler device is installed within a central office to prevent detection of voices, outside the central office, through the fiber link.

12. The system of claim 7, wherein, when generating the vibrations, the first acoustic phase scrambler device generates random phase changes having more than double an intensity than would be generated by voice-induced vibrations and without disrupting communication signals traversing the fiber link.

13. The system of claim 7, wherein the second acoustic phase scrambler device includes another transducer configured to apply vibrations to the fiber link, and another acoustic phase driver configured to control the other transducer; and
    wherein the second acoustic phase scrambler device generates vibrations, within an acoustic bandwidth, that introduce random phase changes to signals in the fiber link.

14. The system of claim 7, wherein the transducer is in direct contact with the fiber link.

15. The system of claim 7, wherein the acoustic phase driver includes control logic implemented on an application-specific integrated circuit (ASIC).

16. The system of claim 7, wherein the acoustic phase driver includes control logic implemented on a field-programmable gate array (FPGA).

17. The system of claim 7, wherein the first acoustic phase scrambler device further includes a housing configured to hold the transducer.

18. The system of claim 7, wherein the fiber link is wrapped around at least a portion of the transducer.

19. The system of claim 7, wherein the first acoustic phase scrambler device further includes a power supply connected to the acoustic phase driver.

20. The system of claim 7, wherein the transducer is a piezoelectric transducer.

* * * * *